United States Patent
Chen et al.

(10) Patent No.: US 9,992,523 B1
(45) Date of Patent: Jun. 5, 2018

(54) SELECTING RECOMMENDATIONS IN A VIDEO DELIVERY SYSTEM USING DIVERSITY AND RELEVANCE

(71) Applicant: HULU, LLC, Santa Monica, CA (US)

(72) Inventors: Laming Chen, Beijing (CN); Guoxin Zhang, Beijing (CN); Bangsheng Tang, Beijing (CN); Hanning Zhou, Plano, TX (US)

(73) Assignee: HULU, LLC, Santa Monica, CA (US)

( * ) Notice: Subject to any disclaimer, the term of this patent is extended or adjusted under 35 U.S.C. 154(b) by 0 days. days.

(21) Appl. No.: 15/399,490

(22) Filed: Jan. 5, 2017

(51) Int. Cl.
| | |
|---|---|
| *H04N 5/445* | (2011.01) |
| *H04N 21/258* | (2011.01) |
| *H04N 21/482* | (2011.01) |
| *H04N 21/435* | (2011.01) |
| *H04N 21/25* | (2011.01) |
| *H04N 21/431* | (2011.01) |
| *H04N 21/234* | (2011.01) |

(52) U.S. Cl.
CPC . *H04N 21/25891* (2013.01); *H04N 21/23418* (2013.01); *H04N 21/251* (2013.01); *H04N 21/431* (2013.01); *H04N 21/4355* (2013.01); *H04N 21/4826* (2013.01)

(58) Field of Classification Search
CPC . H04N 21/25; H04N 21/251; H04N 21/25891
See application file for complete search history.

(56) References Cited

U.S. PATENT DOCUMENTS

| | | | | |
|---|---|---|---|---|
| 2003/0061618 A1* | 3/2003 | Horiuchi | ............... | H04H 60/31 725/87 |
| 2006/0085818 A1* | 4/2006 | Bodlaender | ............. | H04N 7/16 725/46 |
| 2008/0104624 A1* | 5/2008 | Narasimhan | ........... | H04H 60/06 725/13 |

(Continued)

OTHER PUBLICATIONS

Kulesza et al: "Determinantal Point Processes for Machine Learning", arXiv:1207.6083v4 [stat.ML] Jan. 10, 2013; 120 pages.

(Continued)

*Primary Examiner* — Pankaj Kumar
*Assistant Examiner* — Timothy Newlin
(74) *Attorney, Agent, or Firm* — Fountainhead Law Group P.C.

(57) ABSTRACT

A method receives a candidate set of recommendations for video entities on a video delivery service in response to receiving a request to generate a page of an interface. A number for each recommendation is generated that represents a relevance rating of the respective recommendation minus a similarity rating between the respective recommendation and recommendations from the candidate set of recommendations that are added to a subset of recommendations. A recommendation is added to the subset of recommendations that has a maximum probability of being relevant to the user and diverse from the recommendations in the subset of recommendations based on the number. The method then updates the number for recommendations in the candidate set of recommendations based on adding the recommendation to the subset of recommendations. This (Continued)

process is iteratively performed and the subset of recommendations in the page of the interface is provided to a client device.

20 Claims, 7 Drawing Sheets

(56) References Cited

U.S. PATENT DOCUMENTS

| 2010/0070917 A1* | 3/2010 | Gates | G06F 17/30053 |
| | | | 715/810 |
| 2014/0223488 A1* | 8/2014 | Korst | H04N 21/4668 |
| | | | 725/53 |
| 2016/0255410 A1* | 9/2016 | Itoh | H04N 21/25891 |
| | | | 725/14 |

OTHER PUBLICATIONS

Xia et al.: "Learning Maximal Marginal Relevance Model via Directly Optimizing Diversity Evaluation Measures", SIGIR'15, Aug. 9-13, 2015; Santiago, Chile; 2015 ACM; 10 pages.

* cited by examiner

300

1. Input: Candidate set $S$, relevance $r_i > 0$ and normalized feature vector $\phi_i \in \mathbb{R}^d$ for each $i \in S$, expected number of selected items $K$;
2. Initialization: $Y = \emptyset$, vector $c_i = [\,]$, number $d_i = r_i$ for each $i \in S$;
3. while $|Y| < K$ do
   a. Compute $\hat{\imath} = \text{argmax}_{i \in S \setminus Y} d_i$;
   b. if $d_{\hat{\imath}} = 0$ then
   c.     break;
   d. end if
   e. $Y = Y \cup \{\hat{\imath}\}$;
   f. for $i \in S \setminus Y$ do
   g.     $e_i = (r_{\hat{\imath}} r_i \phi_{\hat{\imath}}^T \phi_i - c_{\hat{\imath}}^T c_i)/d_{\hat{\imath}}$;
   h.     $c_i = \begin{bmatrix} c_i \\ e_i \end{bmatrix}$;
   i.     $d_i = (d_i^2 - e_i^2)^{1/2}$;
   j. end for
4. end while Return: $Y$

FIG. 3

SELECTING RECOMMENDATIONS IN A VIDEO DELIVERY SYSTEM USING DIVERSITY AND RELEVANCE

BACKGROUND

In a video delivery service, the quality of the recommendations provided to a user is important. For example, the video delivery service may want to recommend a collection of videos to a user, such as different episodes or movies to the user. Generating recommendations that are relevant to the user may require a large amount of computing resources and time. When operating in a real-time online environment, such as when a user is using an application offered by the video delivery service to select videos to watch, recommendations need to be calculated in a very short amount of time. That is, while a user is browsing a site for the video delivery service, the recommendations may need to be generated as the user logs on to a page or browses to another page. The recommendations need to be computed in the time required to display the new page.

BRIEF DESCRIPTION OF THE DRAWINGS

FIG. 3 depicts an example of an optimization process to select the subset Y from the candidate set S according to one embodiment.

DETAILED DESCRIPTION

Described herein are techniques for a recommendation system in a video delivery system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a recommendation system that considers relevance and diversity in providing recommendations to users. Particular embodiments use an optimization process that can maximize the relevance and diversity to select a subset of recommendations from a candidate set of recommendations. The subset of recommendations can then be provided to the user dynamically in real-time while the user is using the video delivery service. In one embodiment, the process may maximize diversity and relevance of the recommendations that are selected for a subset of recommendations from the candidate set of recommendations. The process may maximize the value of a number that represents relevance of a recommendation minus similarity of the recommendation compared to recommendations already selected. Maximizing the value of the number means that a determinant does not need to be calculated to select the subset of recommendations. By not having to calculate the determinant, the process saves computing resources and runs much faster compared to if the determinant needed to be calculated. Using the optimization process, the video delivery service is able to provide the generation of the subset of recommendations when pages are generated for an application. For example, as a user is navigating in a page of the application, the recommendation engine may generate a candidate set of recommendations and then the optimization process may select a subset of the recommendations that maximizes diversity and relevance. The subset of recommendations may then be displayed on the page that the user is viewing.

Overview

Figure 1:
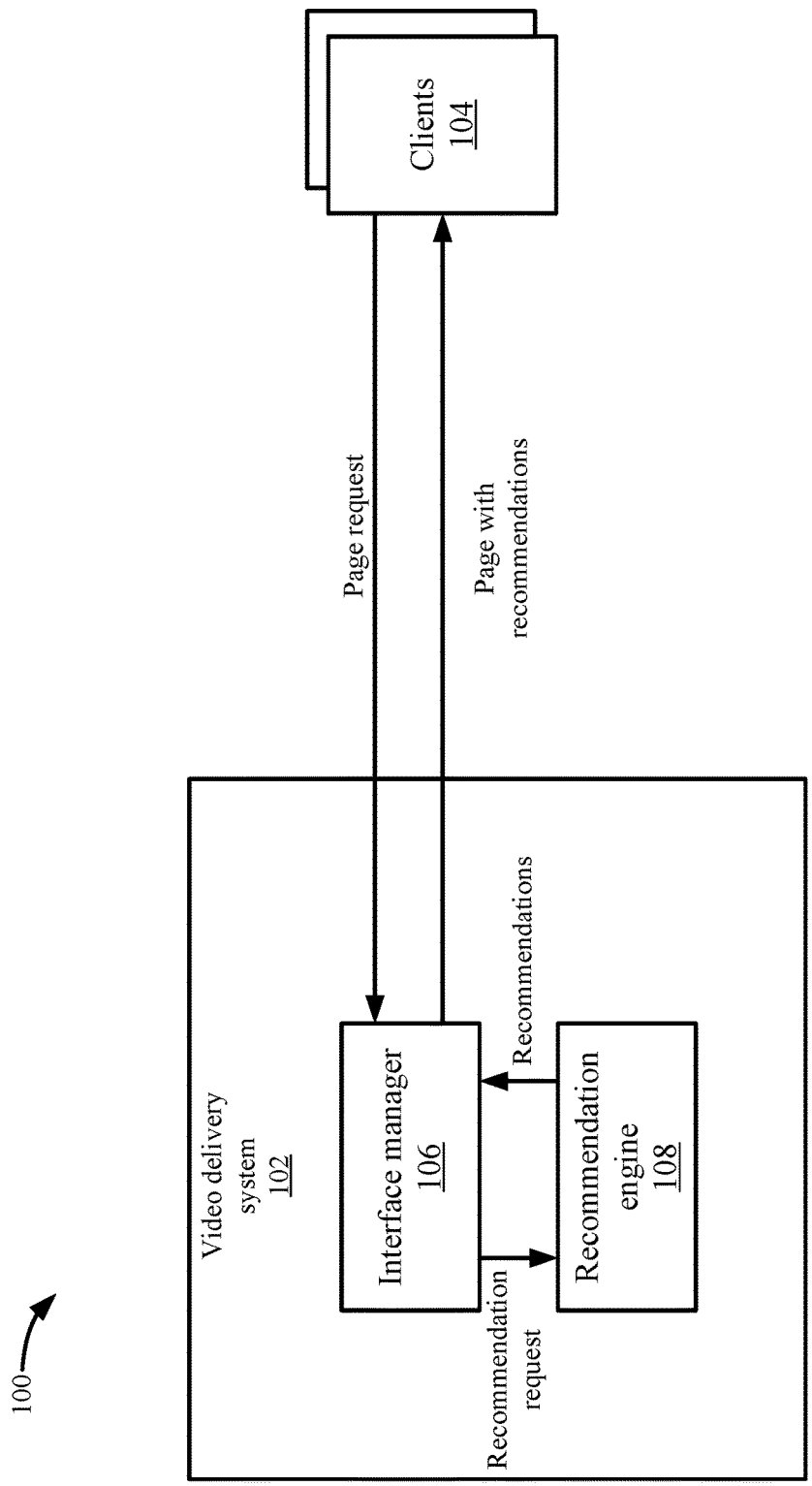
FIG. 1 depicts a simplified system for providing recommendations according to one embodiment.

FIG. 1 depicts a simplified system 100 for providing recommendations according to one embodiment. System 100 includes a video delivery service 102 and clients 104. In one embodiment, users may use clients 104 to access the video delivery service via an application. Clients 104 may browse the application to display different pages of the application. Video delivery service 102 may provide recommendations that are displayed on pages in real-time as the user displays different pages of the application. In one embodiment, a user may log onto the video delivery service and a first page of the application is displayed. In the time taken to generate the first page, video delivery service 102 dynamically generates recommendations for the page. Also, the user may browse to different pages in the application or sections of the page. Video delivery service 102 may once again dynamically generate recommendations in real-time for the pages. In one embodiment, a page may be when new content is displayed by the application. Because the application is operating in a real-time online environment, video delivery service 102 needs to generate the recommendations extremely fast or undesirable delay in delivering the new page to the user may occur. Accordingly, particular embodiments use an optimization process that improves the speed of the computing device by using memory to store variables that are recursively updated to generate the recommendations.

An interface manager 106 may receive requests from clients 104 for pages of the application. When interface manager 106 receives a request, interface manager 106 can contact a recommendation engine 108 to generate recommendations. For example, when a page that is requested includes a section for recommendations, then interface manager 106 contacts recommendation engine 108 upon receiving the request to generate the recommendations for display in the page.

When recommendation engine 108 receives the signal to generate the recommendations, recommendation engine 108 may also receive real-time information that can be used to generate the recommendations. The real-time information may include different information, such as the page in which the recommendations will be displayed, the number of recommendations that should be provided, a context associated with the user, or other information. Recommendation engine 108 then generates a candidate set of recommendations. Each recommendation may be a recommendation for an entity in video delivery service 102. Entities may include videos, such as episodes of television shows and movies. Entities may also include non-video entities, such as actors, networks, etc.

Recommendation engine 108 provides recommendations that are both relevant and diverse. The relevance of the recommendation may be how relevant the entity is to the user. The diversity of the recommendation is how different the recommendation is to other recommendations included in the subset. Typically, a recommendation engine can calculate a candidate recommendation set that includes N recommendations. Generally, N may be a large number and the video delivery service may only want to recommend a subset of the N recommendations to the user. The video delivery service may select the most relevant recommendations to generate the subset. However, this approach may recommend very similar recommendations. To diversify the results, particular embodiments take the similarity of the recommendations into account. However, providing both relevant and diverse recommendations may take a large amount of computing resources and time. To provide both relevant and diverse results, recommendation engine 108 uses an optimization process to generate the subset of recommendations that does not calculate determinants in determining the diverse and relevant recommendations. Rather, numbers representing the determinants are recursively updated in the process to generate the subset of recommendations.

Recommendation engine 108 may use a process that is based on maximizing the relevance-diversity trade-off of the recommendations. The relevance-diversity trade-off can be represented by the probability of appearance of recommendations in the subset of recommendations. In one embodiment, the probability is represented by a determinant of a matrix that involves relevance and similarity of recommendations in the subset of recommendations. The calculating of the determinant uses a large amount of computing resources. If the determinants were calculated upon receiving the signal to generate the recommendations, recommendation engine 108 may not be able to calculate the recommendations in an adequate time for interface manager 106 to respond to the request for the page. Particular embodiments use the optimization process to generate the recommendations by using numbers that represent the determinants. The numbers may be recursively updated when generating the subset of recommendations as will be discussed in more detail below. The recursive updating of the numbers uses less computing resources and can run much faster compared to having to calculate the determinants. Accordingly, the same results may be provided in a faster fashion, which improves the performance of the computing device and also solves a real-world problem in a real-time online network environment.

Recommendation Engine

Figure 2:
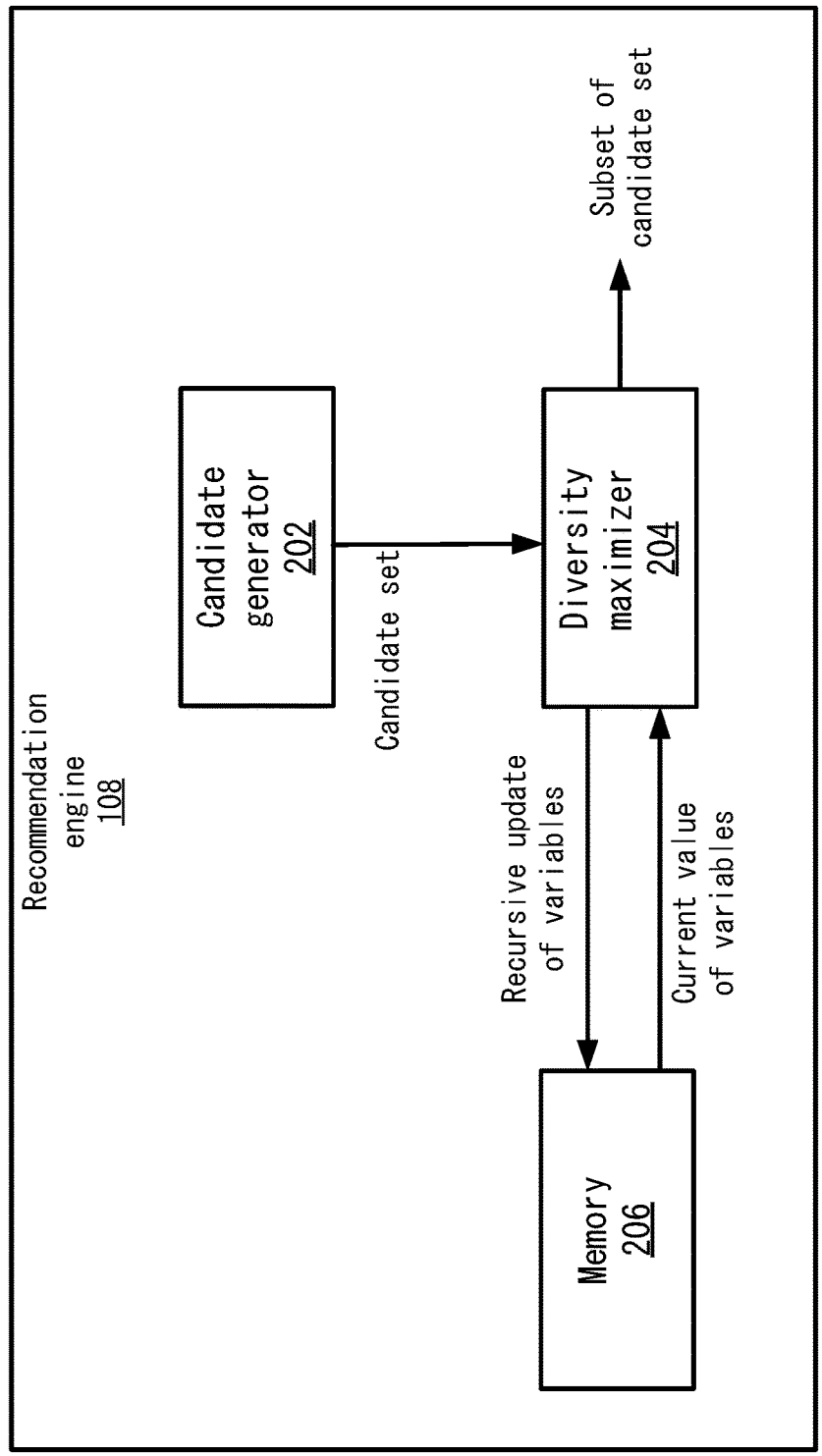
FIG. 2 depicts a more detailed example of a recommendation engine according to one embodiment.

FIG. 2 depicts a more detailed example of recommendation engine 108 according to one embodiment. Recommendation engine 108 includes a candidate generator 202 and a diversity maximizer 204. Candidate generator 202 generates a candidate set of recommendations S along with a relevance, $r_i>0$, for each recommendation in the candidate set. The larger the relevance value for n, the more likely the user will watch the recommendation i if recommended. In one embodiment, the candidate set S is denoted as:

$$S=\{1,2,\ldots,N\},$$

which means the candidate set S contains N recommendations, where N is a number. Typically, the number N is a large number and includes more recommendations than can be displayed on the page that is going to be displayed on client 104. Accordingly, diversity maximizer 204 selects a subset of the candidate recommendations that are provided to client 104. Diversity maximizer 204 selects the subset of the recommendations in the candidate set using an optimization process that uses both diversity and relevance as factors. In one embodiment, the subset of recommendations may be the most relevant and diverse recommendations from the candidate set as determined by the optimization process.

The optimization process may iteratively add recommendations from the candidate set that are considered the most diverse and relevant from the current state of the candidate set. For example, when the optimization process adds a recommendation from the candidate set, that recommendation is removed from the candidate set. Because diversity changes when a recommendation is added to the subset, the optimization process needs to account for the change in diversity in a subsequent iteration. Particular embodiments use the recursive updating of the numbers for the recommendations to represent the change in diversity. Then, the optimization process selects another recommendation from the remaining recommendations in the candidate set. When the most relevant and diverse recommendations have been added to the subset, then the optimization process returns the subset of recommendations. For example, the optimization process runs until the subset includes a limit of K recommendations. However, less than K items can be returned when the subset already includes the most diverse and relevant recommendations before K items are added to the subset.

One embodiment of the process will now be described in more detail. To measure the similarity between different items, diversity maximizer 204 receives input that can be used to generate the subset of recommendations. The similarity between recommendations can be calculated using the feature vectors for the recommendations. For example, diversity maximizer 204 receives a feature vector for each recommendation that represents the corresponding recommendation mathematically. In one example, the features in the feature vector are video related. For example, the vector is organized as [is_drama, is_comedy, is_animation, is_horror, is_thriller], where is_drama means the recommendation is classified as having a feature as a drama, is_comedy having a feature of a comedy, etc. A feature vector of a recommendation #1 that is a drama is [1, 0, 0, 0, 0] because recommendation #1 is a drama, but does not have any of the other features. Also, the feature vector of a recommendation #2 that is an drama is also [1, 0, 0, 0, 0], and the feature vector of a recommendation #3 that is an animation is [0, 0, 1, 0, 0]. Then, the similarity between recommendation #1 and recommendation #2 is 1, and the similarity between recommendation #1 and recommendation #3 is 0. Therefore, recommendation #1 is more similar to recommendation #2 than recommendation #3. In one embodiment, the feature vector is irrelevant to the user. It only represents the intrinsic nature of the recommendation. In contrast, the relevance is the preference of the user to the recommendation. The relevance is different for different users In the optimization process, diversity maximizer 204 receives the candidate set of recommendations S and a number of items for the subset K. Then, diversity maximizer 204 initializes a subset Y as an empty set. The subset Y will contain the recommendations that form a subset of recommendations. Also, diversity maximizer 204 initializes an auxiliary vector $c_i=[\ ]$ and a number $d_i=r_i$ for each recommendation. The auxiliary vector $c_i$ is used to track the information about recommendation i, and the number $d_i$ is used to represent the probability of adding recommendation i to the already selected subset Y considering both relevance and diversity. The number $d_i$ is denoted as the relevance of recommendation i minus similarity between recommendation i and the recommendations in the subset Y. Therefore, a large value for the number $d_i$ means recommendation i is very relevant, and the similarity between recommendation i and the recommendations in subset Y is small.

Diversity maximizer 204 then performs an iteration that can be repeated until the subset Y contains K recommendations or the subset includes the most relevant and diverse recommendations. Generally, diversity maximizer 204 finds a recommendation that is considered the most relevant and diverse from the candidate set S. Diversity maximizer 204 uses the number $d_i$ to select the recommendation that maximizes the probability of having relevant and diverse recommendations in the subset. Then, diversity maximizer 204 determines if the recommendation does not add any diversity to the subset (e.g., the recommendation is similar to a recommendation already in the subset). If the diversity in the subset has been maximized, then the subset has been determined and the recommendation is not added to the subset. In one embodiment, the diversity is maximized if the number $d_i$ is zero meaning that the subset includes recommendations that are the most diverse and relevant possible. That is, if any other recommendations in the candidate set are added to the subset S, then these recommendations would be similar to recommendations already in the subset S. However, if the diversity has not been maximized, then the recommendation can be added to the subset. Because the subset is changed by adding the recommendation to it and also the recommendation is removed from the candidate set, the number $d_i$ and auxiliary vector $c_i$ are recursively updated to represent the change. This allows the optimization process to iteratively continue as another recommendation is selected from the candidate set using the number $d_i$ until the subset includes K recommendations.

In the above process, the number $d_i$ and auxiliary vector $c_i$ are recursively updated to avoid having to calculate a determinant for each iteration. Conventionally, a determinant of a matrix that represents the recommendations in the subset Y and each remaining recommendation in the candidate set needs to be calculated to select the recommendation to add to the subset of recommendations. On each iteration, the determinant needs to be calculated. However, computing the determinant is computationally complex and uses a lot of computing resources and time, which may not be available in an online environment. As will be described in more detail below, particular embodiments use the number $d_i$ to represent the determinant of the matrix. The auxiliary vector $c_i$ can be recursively updated in a prior iteration and be used to update the number $d_i$ in a current iteration. By not having to calculate the determinant on each iteration, diversity maximizer 204 reduces the computational complexity and uses less computing resources.

Optimization Process

The following will describe the optimization process in more detail. FIG. 3 depicts an example of an optimization process 300 to select the subset Y from the candidate set S according to one embodiment. To measure the similarity between different items, diversity maximizer 204 uses a feature vector $\phi_i \in \mathbb{R}^d$ for each i∈S, where d is the dimension of the vector, $\phi_i$ is normalized such that $\|\phi_i\|_2=1$, and i is a variable representing the number of each recommendation in the candidate set. In one embodiment, the similarity between i (e.g., a first recommendation) and j (e.g., a second recommendation) can be calculated as the inner-product of vector $\phi_i$ and vector $\phi_j$, e.g., $\phi_i^T \phi_j$. Normalizing puts the recommendations on the same level. The feature vector represents the intrinsic nature of the recommendation. For example, the feature vector of recommendation #1 is [1, 0, 0, 0, 0], the feature vector of recommendation #2 is [1, 0, 0, 0, 0], and the feature vector of recommendation #3 is [1, 1, 0, 0, 0]. If diversity maximizer 204 does not normalize the feature vectors, then the similarity between recommendation #1 and recommendation #2 is 1, and the similarity between recommendation #1 and recommendation #3 is also 1. If diversity maximizer 204 normalizes the feature vectors, then the feature vector of recommendation #3 becomes [0.7071, 0.7071, 0, 0, 0], and the similarity between recommendation #1 and recommendation #3 becomes 0.7071. In this case, recommendation #2 is more similar to recommendation #1 than recommendation #3, which may make more sense given their feature vectors are the same.

In line 1, the process receives input of the candidate set S with recommendations that have a relevance $r_i>0$, a normalized feature vector $\phi i \in \mathbb{R}^d$ for each i∈S, and an expected number of selected recommendations K. The variable "i" is the number of each recommendation in the candidate set of recommendations. The feature vector is determined for each recommendation in the candidate set.

In line 2, diversity maximizer 204 initializes the subset Y to be empty, the auxiliary vector $c_i$ to be an empty vector [ ], and a number $d_i$ to be equal to the relevance $r_i$ for each recommendation ($d_i = r_i$ for each i∈S). The subset Y contains the number of recommendations added to the subset of recommendations. The number $d_i$ denotes relevance of recommendation i minus similarity between recommendation i and all the recommendations in subset Y. Initially, subset Y is empty, and the similarity between recommendation i and all the recommendations in subset Y is zero. Therefore, the number $d_i$ is initialized as the relevance. As diversity maximizer 204 puts more recommendations in subset Y, the number $d_i$ will reflect both relevance and diversity.

In line 3, diversity maximizer 204 determines which recommendation should be added to the subset Y. For example, in line 3a, diversity maximizer 204 selects a recommendation in which the number $d_i$ is maximized. This finds an recommendation in the candidate set S in which the number $d_i$ is maximized and this is denoted as $\hat{I}$. The formula used to compute $\hat{I}$ calculates the maximum probability of adding one of the recommendations to the subset using $d_i$. That is, the formula in line 3a is finding a recommendation i such that the number $d_i$ is the largest among all recommendations i in the candidate set S compared to the recommendations in the subset Y. For example, S={1, 2, 3, 4, 5}, Y={2,4}, then the remaining recommendations that have not been added to the subset Y is S\Y={1, 3, 5}. If $d_1=4$, $d_2=4$, $d_3=2$, $d_4=6$, $d_5=5$, and diversity maximizer 204 attempts to find a recommendation i such that $d_i$ is the largest for all i in {1, 3, 5}. Diversity maximizer 204 compares the numbers $d_1$, $d_3$, $d_5$, and determines that $d_5=5$ is the largest among the numbers. This means $\hat{I}=5$ (recommendation #5).

Then, in lines 3b and 3c, diversity maximizer 204 determines if $d_{\hat{I}}=0$. The number $d_{\hat{I}}$ represents the probability that the subset includes diverse recommendations. If the probability is zero, then that means adding the recommendation to the subset would not add any diversity. If this is the case, then the process ends as the probability has been maximized for diversity in the subset. That is, adding another recommendation from the candidate set to the subset would not provide any more diversity or relevance to the subset of recommendations.

In line 3e, if the value of $d_i$ is not zero, then diversity maximizer 204 adds the recommendation to the subset Y. The number $d_i$ and auxiliary vector $c_i$ then need to be recursively updated based on the adding of the recommendation to the subset and removal of the recommendation from the candidate set. Lines 3f-3j perform the updating of $d_i$. In each iteration, the recommendation is added to the subset Y, diversity maximizer 204 updates the auxiliary vector $c_i$ and number $d_i$ for all recommendations that do not belong to subset Y. For example, the new value of $d_i$ may be calculated for each recommendation based on the adding of the recommendation to the subset. For each recommendation, a variable $e_i$ is calculated and then used to update $c_i$ and $d_i$. In line 3g, the variable $e_i$ is calculated. The variable $e_i$ can be regarded as the similarity between recommendation i and the recommendation that was just added to subset Y. Then, in line 3h the auxiliary vector $c_i$ is updated based on $e_i$ and $c_i$. For example, diversity maximizer 204 appends the variable $e_i$ as the last element of the auxiliary vector $c_i$. Therefore, the auxiliary vector $c_i$ stores the similarities between recommendation i and all the recommendations in the subset Y. For example, before this calculation, $c_i=[4, 2, 3, 1]$, and $e_i=3$. Then diversity maximizer 204 appends the variable $e_i$ as the last element of the auxiliary vector $c_i$, and the auxiliary vector $c_i$ is updated as $c_i=[4, 2, 3, 1, 3]$. The variable $c_i$ is needed to update the variable $e_i$ in a subsequent iteration so the variable $c_i$ is updated here to reflect the recommendation being added to the subset Y. Then, diversity maximizer 204 calculates the value for the number $d_i$ using $d_i$ and $e_i$. Basically, the number $d_i$ represents the probability of adding recommendation i to the already selected subset Y, considering both relevance and diversity. The number $d_i$ is denoted as relevance of recommendation i minus the similarity between recommendation i and all the recommendations in subset Y. In each iteration, the variable $e_i$ is the similarity between recommendation i and the recommendation i that was just added to subset Y. So, diversity maximizer 204 updates $d_i$ as $d_i^2=d_i^2-e_i^2$ to take into account the change in diversity in adding the recommendation to the subset Y. The use of the variable $e_i$ update the variable $c_i$ and the number $d_i$ allows the process to avoid calculating a determinant on each iteration.

The process then reiterates to line 3a to select another recommendation to add to the subset of recommendations. The new value of $d_i$ is used to select the recommendation that has the maximum probability of being the most diverse and relevant recommendation from the candidate set. Then, upon adding of a new recommendation to the subset Y, the previously updated value of auxiliary vector $c_i$ is used to update the variable $e_i$.

Example

In one example, there are 10 recommendations in the candidate set S={1, 2, 3, 4, 5, 6, 7, 8, 9, 10}, and the relevance for each recommendation is:
$r_1=0.6$; $r_2=0.5$; $r_3=0.3$; $r_4=0.1$; $r_5=0.7$; $r_6=0.4$; $r_7=0.2$; $r_7=0.2$; $r_8=0.8$; $r_9=0.2$; $r_{10}=0.4$.

The normalized feature vector for each recommendation is:

$$\phi_1 = \begin{bmatrix} 1 \\ 0 \\ 0 \\ 0 \\ 0 \end{bmatrix}; \phi_2 = \begin{bmatrix} 0 \\ 1 \\ 0 \\ 0 \\ 0 \end{bmatrix}; \phi_3 = \begin{bmatrix} 0 \\ 0 \\ 1 \\ 0 \\ 0 \end{bmatrix}; \phi_4 = \begin{bmatrix} 0 \\ 0 \\ 0 \\ 1 \\ 0 \end{bmatrix}; \phi_5 = \begin{bmatrix} 0 \\ 0 \\ 0 \\ 0 \\ 1 \end{bmatrix};$$

-continued $$\phi_6 = \begin{bmatrix} 0.6 \\ 0.8 \\ 0 \\ 0 \\ 0 \end{bmatrix}; \phi_7 = \begin{bmatrix} 0 \\ 0.6 \\ 0.8 \\ 0 \\ 0 \end{bmatrix}; \phi_9 = \begin{bmatrix} 0 \\ 0 \\ 0 \\ 0.6 \\ 0.8 \end{bmatrix}; \phi_9 = \begin{bmatrix} 0 \\ 0 \\ 0 \\ 0.6 \\ 0.8 \end{bmatrix}; \phi_{10} = \begin{bmatrix} 0.8 \\ 0 \\ 0 \\ 0 \\ 0.6 \end{bmatrix}.$$

In this case, diversity maximizer 204 wants to select K=3 recommendations out of the candidate set S. Diversity maximizer 204 initializes the subset Y to 0, and the auxiliary vector $c_i$ to:

$c_1 = [\ ]; c_2 = [\ ]; c_3 = [\ ]; c_4 = [\ ]; c_5 = [\ ];$
$c_6 = [\ ]; c_7 = [\ ]; c_8 = [\ ]; c_9 = [\ ]; c_{10} = [\ ];$

Also, the number $d_i$ is initialized to:
$d_1=0.6$; $d_2=0.5$; $d_3=0.3$; $d_4=0.1$; $d_5=0.7$; $d_6=0.4$; $d_7=0.2$; $d_8=0.8$; $d_9=0.2$; $d_{10}=0.4$.

In the first iteration, diversity maximizer 204 computes i to find the number $d_i$ that is the largest in the recommendations that have not been added to the subset Y. In this case, recommendation #8 has the largest number $d_i$ and $\hat{1}=8$. The number $d_i$ is larger than 0 and the process continues. The following then updates the number $d_1$ as follows:
i=1; $e_1=0$; $c_1=[0]$; $d_1=0.6$
i=2; $e_2=0$; $c_2=[0]$; $d_2=0.5$
i=3; $e_3=0.18$; $c_3=[0.18]$; $d_3=0.24$
i=4; $e_4=0.08$; $c_4=[0.08]$; $d_4=0.06$
i=5; $e_5=0$; $c_5=[0]$; $d_5=0.7$
i=6; $e_6=0$; $c_6=[0]$; $d_6=0.4$
i=7; $e_7=0.096$; $c_7=[0.096]$; $d_7=0.1754537$
i=9; $e_9=0.096$; $c_9=[0.096]$; $d_9=0.1754537$
i=10; $e_{10}=0$; $c_{10}=[0]$; $d_{10}=0.4$ The process then reiterates to perform a second iteration. Since recommendation #8 has been added to the subset Y, the remaining recommendations in the candidate set are S={1, 2, 3, 4, 5, 6, 7, 9, 10}. Finding the highest number $d_i$ among the remaining recommendations yields recommendation #5 with a number $d_i$ of 0.7, which is above zero. Then, diversity maximizer 204 updates the number $d_i$ as follows:

$$i = 1; e_1 = 0; c_1 = \begin{bmatrix} 0 \\ 0 \end{bmatrix}; d_1 = 0.6$$

$$i = 2; e_2 = 0; c_2 = \begin{bmatrix} 0 \\ 0 \end{bmatrix}; d_2 = 0.5$$

$$i = 3; e_3 = 0; c_3 = \begin{bmatrix} 0.18 \\ 0 \end{bmatrix}; d_3 = 0.24$$

$$i = 4; e_4 = 0; c_4 = \begin{bmatrix} 0.08 \\ 0 \end{bmatrix}; d_4 = 0.06$$

$$i = 6; e_6 = 0; c_6 = \begin{bmatrix} 0 \\ 0 \end{bmatrix}; d_6 = 0.4$$

$$i = 7; e_7 = 0; c_7 = \begin{bmatrix} 0.096 \\ 0 \end{bmatrix}; d_7 = 0.1754537$$

$$i = 9; e_9 = 0.16; c_9 = \begin{bmatrix} 0.096 \\ 0.16 \end{bmatrix}; d_9 = 0.072$$

$$i = 10; e_{10} = 0.24; c_{10} = \begin{bmatrix} 0 \\ 0.24 \end{bmatrix}; d_{10} = 0.32$$

The process then reiterates to perform a third iteration. Since recommendation #5 has been added to the subset Y, the remaining recommendations in the candidate set are S={1, 2, 3, 4, 6, 7, 9, 10}. Finding the highest number $d_i$ among the remaining recommendations yields recommendation #1 with a number $d_i$ of 0.6, which is above zero. Then, diversity maximizer 204 updates the number $d_i$ as follows:

$$i = 2;\ e_2 = 0;\ c_2 = \begin{bmatrix} 0 \\ 0 \\ 0 \end{bmatrix};\ d_2 = 0.5$$

$$i = 3;\ e_3 = 0;\ c_3 = \begin{bmatrix} 0.18 \\ 0 \\ 0 \end{bmatrix};\ d_3 = 0.24$$

$$i = 4;\ e_4 = 0;\ c_4 = \begin{bmatrix} 0.08 \\ 0 \\ 0 \end{bmatrix};\ d_4 = 0.06$$

$$i = 6;\ e_6 = 0.24;\ c_6 = \begin{bmatrix} 0 \\ 0 \\ 0.24 \end{bmatrix};\ d_6 = 0.32$$

$$i = 7;\ e_7 = 0;\ c_7 = \begin{bmatrix} 0.096 \\ 0 \\ 0 \end{bmatrix};\ d_7 = 0.1754537$$

$$i = 9;\ e_9 = 0;\ c_9 = \begin{bmatrix} 0.096 \\ 0.16 \\ 0 \end{bmatrix};\ d_9 = 0.072$$

$$i = 10;\ e_{10} = 0.32;\ c_{10} = \begin{bmatrix} 0 \\ 0.24 \\ 0.32 \end{bmatrix};\ d_{10} = 0$$

The process then ends because the subset Y has reached the limit of three recommendations, Y={8, 5, 1}.

Because $d_i$ is a number, the optimization process can be performed more quickly than if the determinant is calculated for a matrix that represents recommendations in the subset Y and each remaining recommendation in the candidate set. The value of $d_i$ encompasses the relevance of recommendation i and similarity between recommendations based on the feature vector. Using the number $d_i$, the determinant of the matrix does not need to be calculated every iteration. The following shows that the number $d_i$ represents the determinant of a matrix. In one example, î could be calculated as follows:

$$\hat{i} = \mathrm{argmax}_{i \in S \setminus Y} \det(A_{Y \cup \{i\}, Y \cup \{i\}})$$

The variable "A" is a kernel matrix $A \in \mathbb{R}^{N \times N}$ with $$A_{i,j} = r_i r_j \phi_i^T \phi_j$$

The kernel matrix represents the relevance of recommendations and similarity between recommendations based on the feature vector $\phi_1$. The decomposition of $A_{Y,Y} = LL^T$, where L is a lower triangular matrix with positive diagonal entries, and the decomposition of $$A_{Y \cup \{i\}, Y \cup \{i\}} \text{ is } A_{Y \cup \{i\}, Y \cup \{i\}} = \begin{bmatrix} A_{Y,Y} & A_{Y,i} \\ A_{i,Y} & A_{i,i} \end{bmatrix} = \begin{bmatrix} L & 0 \\ c_i^T & d_i \end{bmatrix} \begin{bmatrix} L^T & c_i \\ 0 & d_i \end{bmatrix}$$

where $c_i \in \mathbb{R}^{|Y|}$ and $d_i \geq 0$. Then $c_i$ and $d_i$ satisfies $$Lc_i = A_{Y,i}, d_i^2 = A_{i,i} - \|c_i\|_2^2, \det(A_{Y \cup \{i\}, Y \cup \{i\}}) = \det(A_{Y,Y}) \cdot d_i^2$$

This means that $d_i$ is equal to a square root of $\det(A_{Y \cup \{i\}, Y \cup \{i\}})/\det(A_{Y,Y})$. The $\det(A_{YY})$ represents the probability of the appearance of recommendation set Y. The $\det(A_{YY}d)$ is the determinant of matrix $A_{YY}$. If A is a 5 by 5 matrix, Y={2, 3}, then $A_{YY}$ is a 2 by 2 matrix, the first row is [$A_{22}$, $A_{23}$], the second row is [$A_{32}$, $A_{33}$]. Similarly, $\det(A_{Y \cup \{i\}, Y \cup \{i\}})$ represents the probability of the appearance of recommendation set YU{i}. If i=5, then YU{i}={2, 3, 5}, $A_{Y \cup \{i\}, Y \cup \{i\}}$ is a 3 by 3 matrix, the first row is [$a_{22}$, $a_{23}$, $a_{25}$], the second row is [$A_{32}$, $A_{33}$, $A_{35}$], the third row is [$A_{52}$, $A_{53}$, $A_{55}$]. Since the subset Y is the already selected recommendation set, the larger $\det(A_{Y \cup \{i\}, Y \cup \{i\}})$ is, the more likely recommendation i should be added to subset Y. That is why finding i that maximizes $\det(A_{Y \cup \{i\}, Y \cup \{i\}})$ finds a recommendation that is most relevant and maximizes diversity. According to the above equation, $\det(A_{Y \cup \{i\}, Y \cup \{i\}})$ equals to $\det(A_{YY})$ times $d_i^2$. Y is the already selected recommendation set and it is fixed for different i. Therefore, $\det(A_{YY})$ can be regarded as a constant now. The larger $d_i$ is, the larger $\det(A_{Y \cup \{i\}, Y \cup \{i\}})$ is. Since diversity maximizer 204 is interested in the recommendation i that maxmizes $\det(A_{Y \cup \{i\}, Y \cup \{i\}})$, diversity maximizer 204 only needs to find the recommendation i that maximizes the number $d_i$. Therefore, the problem can be recast as $$\hat{i} = \mathrm{argmax}_{i \in S \setminus Y} d_i$$

and the lower triangular matrix can be updated as $$L' = \begin{bmatrix} L & 0 \\ c_i^T & d_i \end{bmatrix}$$

As a result, for $i \notin Y \cup \{\hat{i}\}$ in line 3e of FIG. 3, $$Lc_i = A_{Y,i}, \begin{bmatrix} L & 0 \\ c_i^T & d_i \end{bmatrix} c_i' = L'c_i' = A_{Y \cup \{i\}, i} = \begin{bmatrix} A_{Y,i} \\ A_{i,i} \end{bmatrix}$$

and $c_i$ and $d_i$ can be updated in lines 3g-3i in FIG. 3 as $$c_i' = \begin{bmatrix} c_i \\ (A_{i,\hat{i}} - c_{\hat{i}}^T c_i)/d_{\hat{i}} \end{bmatrix},$$

$$(d_i')^2 = A_{i,i} - \|c_i'\|_2^2 = d_i^2 - ((A_{i,\hat{i}} - c_{\hat{i}}^T c_i)/d_{\hat{i}})^2$$

By recursively updating the auxiliary vector $c_i$ and the number $d_i$, the same result as using the determinant occurs by using the number $d_i$. The number $d_i$ is formulated with the auxiliary vector $c_i$ such that the same result is received compared to if the determinant is used. The recursive updating of the number $d_i$ and the auxiliary vector $c_i$ allows diversity maximizer 204 to not have to calculate a determinant on every iteration.

Storage Usage

Referring back to FIG. 2, to perform the iteration, diversity maximizer 204 needs to store information for the variables in memory 206. For example, Y, $c_i$, $d_i$, and $e_i$ are variables and change value throughout the iteration and are stored in a table in memory 206. After each iteration, diversity maximizer 204 may update the values for the variables. Once the process has ended, diversity maximizer 204 can output the subset Y. The subset includes recommendations that are considered to be the most relevant and diverse out of the candidate set S.

Figure 4:
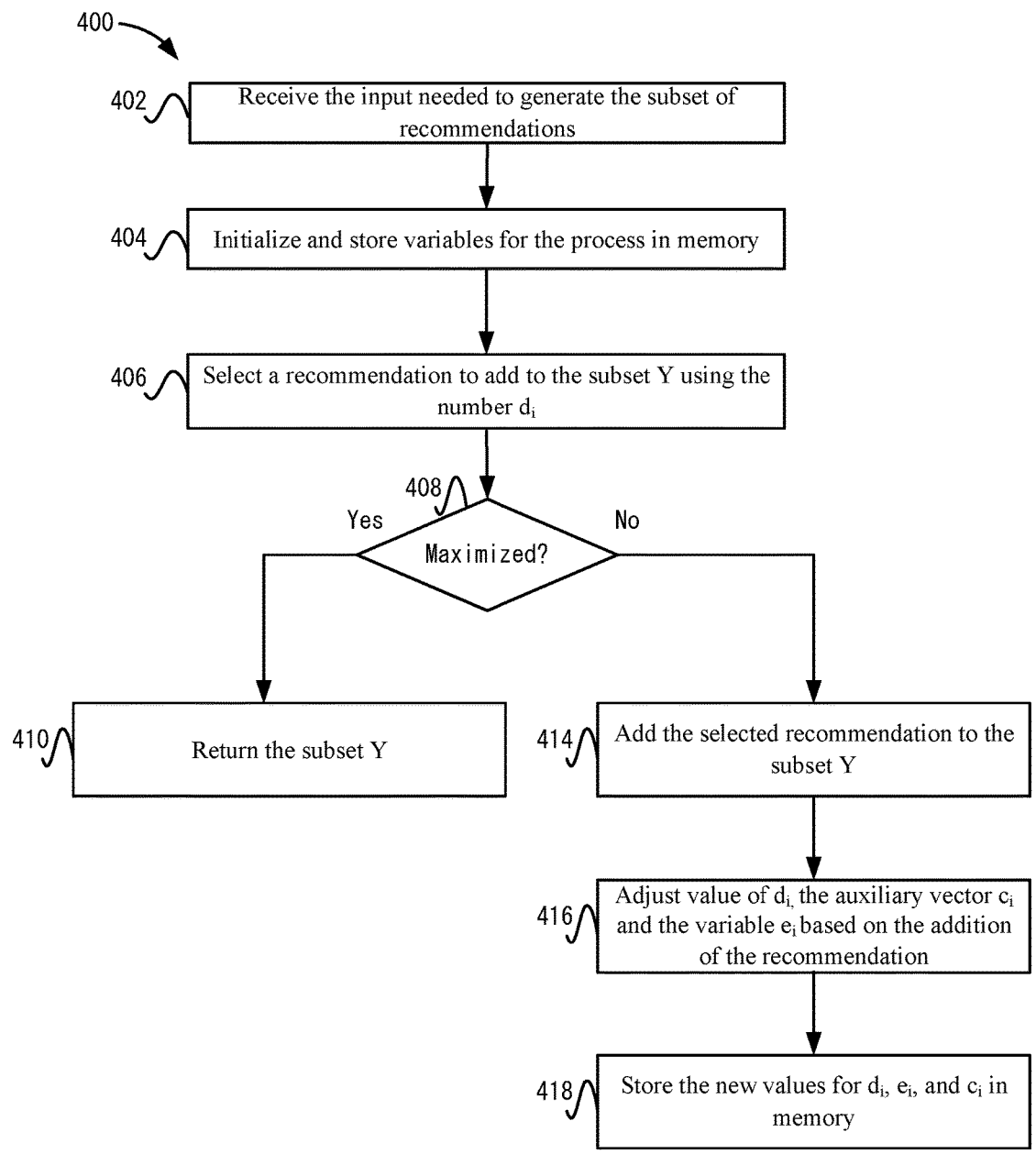
FIG. 4 depicts a simplified flowchart of a method for selecting the subset of recommendations according to one embodiment.

FIG. 4 depicts a simplified flowchart 400 of a method for selecting the subset of recommendations according to one embodiment. At 402, diversity maximizer 204 receives the input needed to generate the subset of recommendations as described above.

At 404, diversity maximizer 204 initializes and stores variables for the process in memory 206. The variables may include the subset Y, the auxiliary vector $c_i$, the number $d_i$ for each recommendation using the relevance $r_i$, the feature vector 4L, the variable $e_i$, and the variable $c_i$.

At 406, diversity maximizer 204 selects a recommendation to add to the subset Y using the number $d_i$. The recommendation that is selected may be the recommendation that is considered the most relevant and most diverse that is left in the candidate set.

At 408, diversity maximizer 204 determines if diversity has been maximized. For example, if $d_i$ is 0, then there is no other recommendation in the candidate set that can add diversity to the subset Y. If $d_i$ is 0, then at 410, diversity maximizer 204 returns the subset Y.

If $d_i$ is not zero, then at 412, the selected recommendation is added to the subset Y. Due to the recommendation being added to the subset Y, diversity maximizer 204 adjusts value of $d_i$ the auxiliary vector $c_i$ and the variable $e_i$ based on the addition of the recommendation at 416. At 418, diversity maximizer 204 then stores the new values for $d_i$, $e_i$, and $c_i$ in memory 206. These values are then used in the next iteration of the optimization process.

Accordingly, by recursively updating the variables $d_i$, $e_i$, and $c_i$ in memory 206, diversity maximizer 204 can determine the subset faster than if a determinant needed to be calculated. The variable $d_i$ represents the determinant and can be used to maximize the probability for relevance and diversity of recommendations in the subset. The recursive nature of the process uses a prior value $c_i$ in memory 206 to update the value of $d_i$ when an recommendation has been added to the subset. This is faster than calculating the determinant again in another iteration.

Interface

Figure 5:
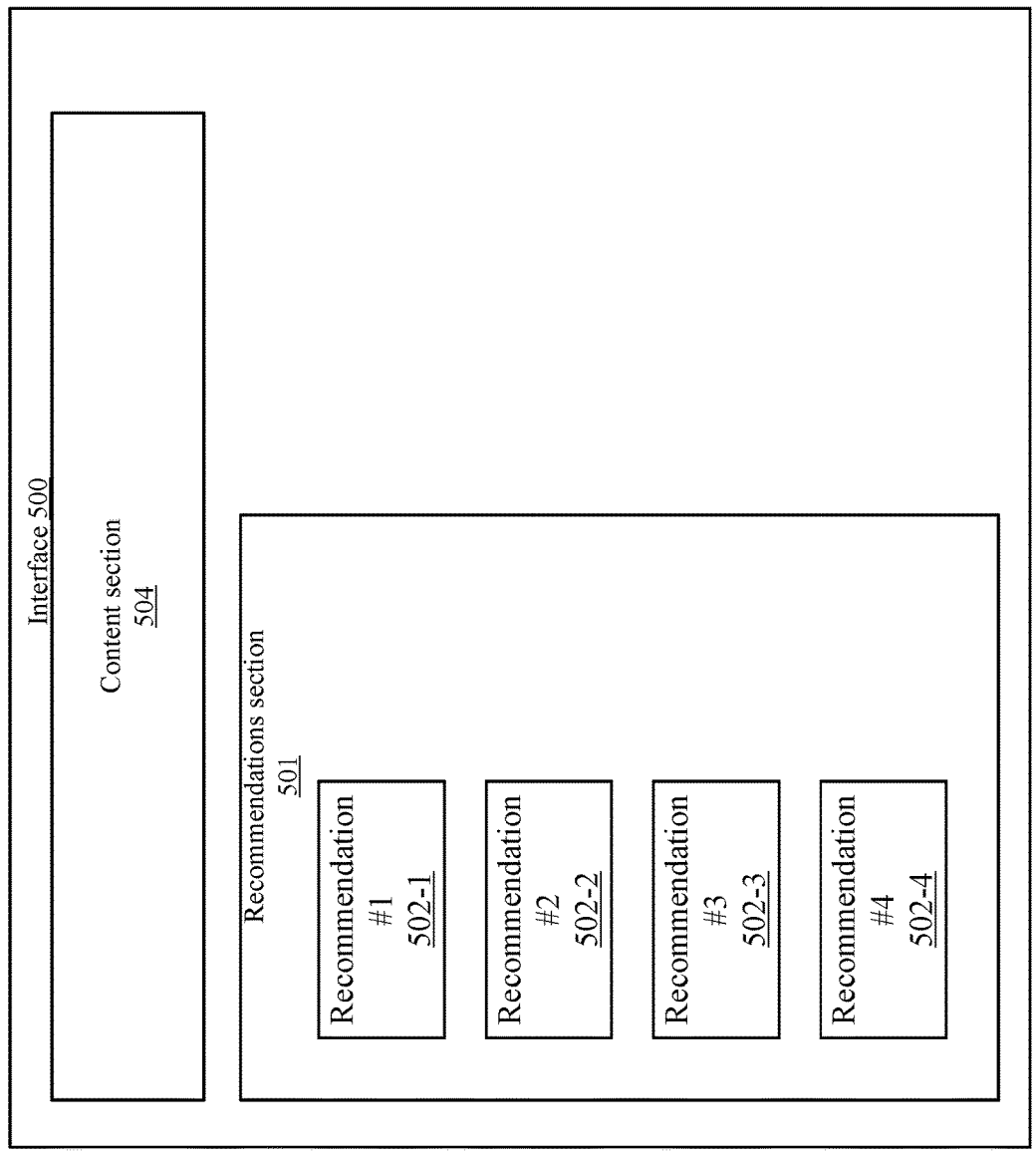
FIG. 5 depicts an example of an interface that displays recommendations according to one embodiment.

FIG. 5 depicts an example of an interface 500 that displays recommendations according to one embodiment. Interface 500 may display a page from an application. A recommendations section 501 includes a subset of recommendations 502-1-502-4 from the candidate set. Also, a content section 504 includes content for the page that is downloaded and displayed that is different from the recommendations. Interface 500 is generated in an online environment in response to the user requesting a page of the application. Recommendations 502 should be generated in the time taken to retrieve and display the other content in other content section 504.

System Overview

Figure 6:
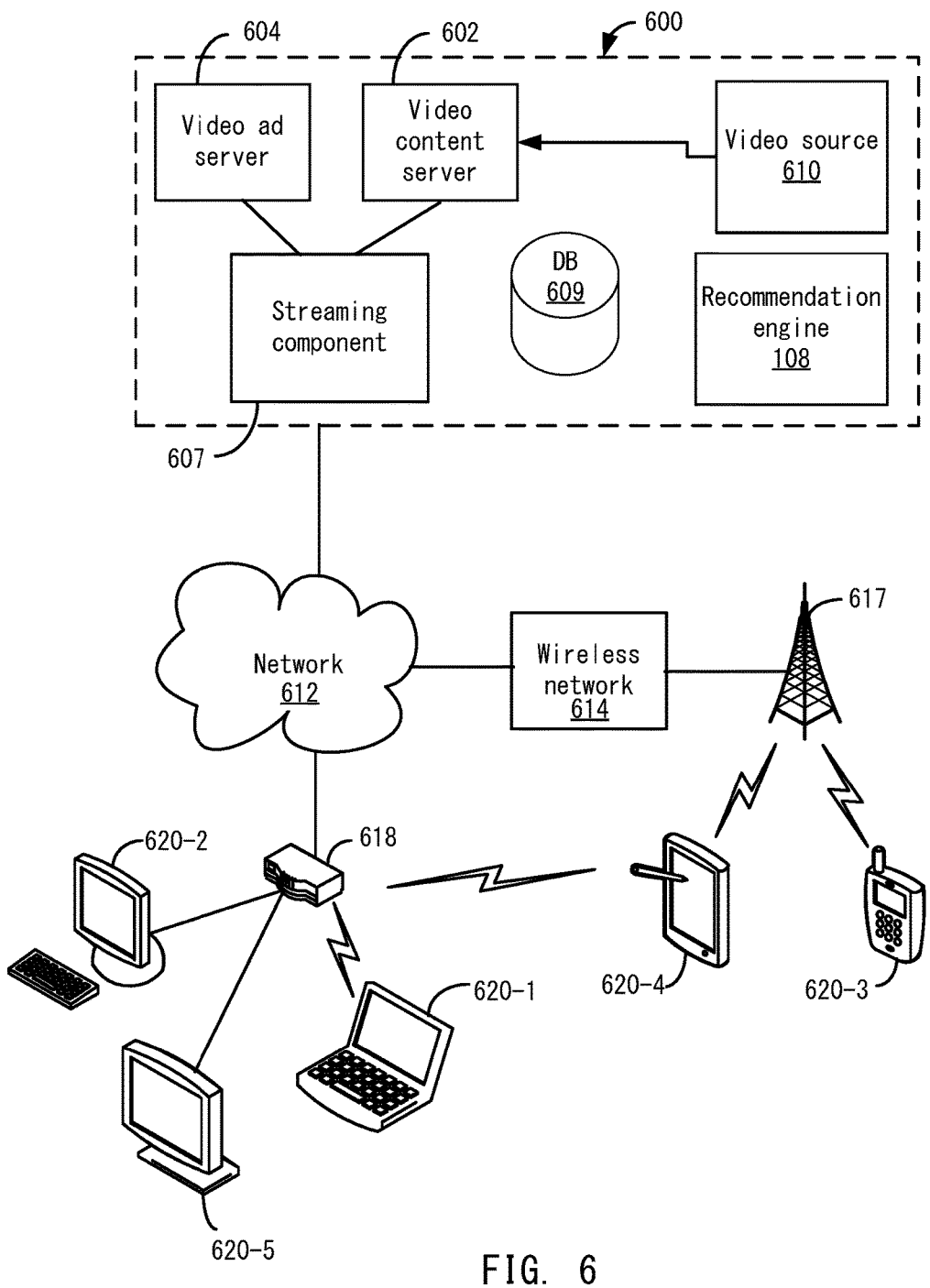
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include recommendation engine 108.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612 and/or other network 614. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless telephony network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
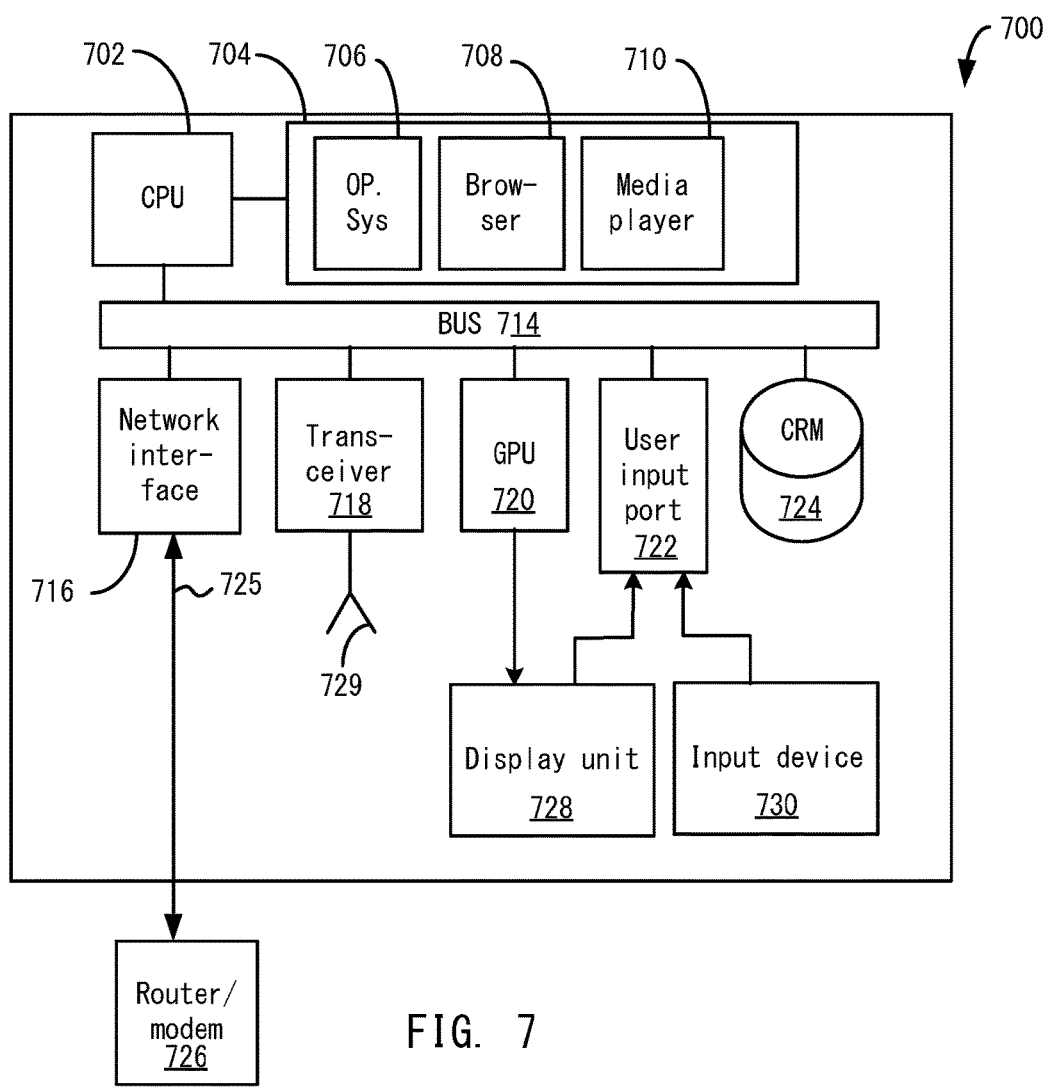
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further be configured to display the page with the subset of recommendations. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, and 710 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device, a candidate set of recommendations for video entities on a video delivery service in response to receiving a request from a client device to generate a page of an interface in an online environment;

receiving, by the computing device, relevance ratings for recommendations in the candidate set of recommendations, wherein a relevance rating is based on a recommendation's relevance to a user using the client device;

generating, by the computing device, a number for each recommendation that represents the relevance rating of the respective recommendation minus a similarity rating between the respective recommendation and recommendations from the candidate set of recommendations that are added to a subset of recommendations;

adding, by the computing device, a recommendation from the candidate set of recommendations to the subset of recommendations that has a maximum probability of being relevant to the user and diverse from the recommendations in the subset of recommendations based on the number, wherein adding the recommendation to the subset of recommendations removes the recommendation from the candidate set of recommendations;

updating, by the computing device, the number for recommendations in the candidate set of recommendations based on adding the recommendation to the subset of recommendations, wherein updating the number comprises:

retrieving a first value of a first variable that was stored in memory from a prior iteration;

using the first value of the first variable to generate a second value of a second variable; and using the second value to update the number;

iteratively performing, by the computing device, the adding and the updating until a limit of a number of recommendations in the subset of recommendations is reached or the probability of adding any recommendation from the candidate set is zero; and providing, by the computing device, the subset of recommendations in the page of the interface to the client device in the online environment.

2. The method of claim 1, further comprising:

updating the first value of the first variable using the second value of the second variable.

3. The method of claim 1, wherein:
the first variable tracks similarity between a respective recommendation and the recommendations in the subset of recommendations; and
the second variable tracks similarity between the respective recommendation and the recommendation that was added to the subset of recommendations.

4. The method of claim 1, wherein using the first value of the first variable from the prior iteration to generate the second value of the second variable updates the second value based on adding the recommendation to the subset of recommendations.

5. The method of claim 1, further comprising:
selecting a recommendation from the candidate set of recommendations;
determining if the number for the recommendation is zero; and
when the number for the recommendation is zero, not adding the recommendation to the subset of recommendations.

6. The method of claim 1, wherein when the subset of recommendations includes zero recommendations, setting the number for the respective recommendations to the relevance rating for the respective recommendations.

7. The method of claim 6, wherein as recommendations are added to the subset of recommendations, the number is updated to reflect a change in the diversity rating for the recommendations.

8. The method of claim 1, wherein the subset of recommendations is selected without calculating a determinant of a matrix that reflects the relevance rating and the diversity rating for each respective recommendation.

9. The method of claim 1, wherein the subset of recommendations is selected in a time required to generate other content on the page.

10. The method of claim 1, further comprising:
in a first iteration, storing the first value, the second value, and the number in the memory; and
in a second iteration, retrieving the number from the memory to use in selecting the recommendation from the candidate set of recommendations; and
in the second iteration, updating the first value, the second value, and the number in the memory based on adding the recommendation to the subset of recommendations.

11. The method of claim 1, wherein using the second value to update the number avoids having to calculate a determinant in a next iteration.

12. The method of claim 1, wherein using the number to add a recommendation to the subset of recommendations avoids having to calculate a determinant to add the recommendation.

13. A non-transitory computer-readable storage medium containing instructions, that when executed, control a computer system to be configured for:
receiving, by a computing device, a candidate set of recommendations for video entities on a video delivery service in response to receiving a request from a client device to generate a page of an interface in an online environment;
receiving, by the computing device, relevance ratings for recommendations in the candidate set of recommendations, wherein a relevance rating is based on a recommendation's relevance to a user using the client device;
generating, by the computing device, a number for each recommendation that represents the relevance rating of the respective recommendation minus a similarity rating between the respective recommendation and recommendations from the candidate set of recommendations that are added to a subset of recommendations;
adding, by the computing device, a recommendation from the candidate set of recommendations to the subset of recommendations that has a maximum probability of being relevant to the user and diverse from the recommendations in the subset of recommendations based on the number, wherein adding the recommendation to the subset of recommendations removes the recommendation from the candidate set of recommendations;
updating, by the computing device, the number for recommendations in the candidate set of recommendations based on adding the recommendation to the subset of recommendations, wherein updating the number comprises:
retrieving a first value of a first variable that was stored in memory from a prior iteration;
using the first value of the first variable to generate a second value of a second variable; and
using the second value to update the number;
iteratively performing, by the computing device, the adding and the updating until a limit of a number of recommendations in the subset of recommendations is reached or the probability of adding any recommendation from the candidate set is zero; and
providing, by the computing device, the subset of recommendations in the page of the interface to the client device in the online environment.

14. The non-transitory computer-readable storage medium of claim 13, wherein:
the first variable tracks similarity between a respective recommendation and the recommendations in the subset of recommendations; and
the second variable tracks similarity between the respective recommendation and the recommendation that was added to the subset of recommendations.

15. The non-transitory computer-readable storage medium of claim 13, wherein using the first value of the first variable from the prior iteration to generate the second value of the second variable updates the second value based on adding the recommendation to the subset of recommendations.

16. The non-transitory computer-readable storage medium of claim 13, further configured for:
selecting a recommendation from the candidate set of recommendations;
determining if the number for the recommendation is zero; and
when the number for the recommendation is zero, not adding the recommendation to the subset of recommendations.

17. The non-transitory computer-readable storage medium of claim 13, wherein when the subset of recommendations includes zero recommendations, setting the number for the respective recommendations to the relevance rating for the respective recommendations.

18. The non-transitory computer-readable storage medium of claim 17, wherein as recommendations are added to the subset of recommendations, the number is updated to reflect a change in the diversity rating for the recommendations.

19. The non-transitory computer-readable storage medium of claim 13, further configured for:
in a first iteration, storing the first value, the second value, and the number in the memory; and in a second iteration, retrieving the number from the memory to use in selecting the recommendation from the candidate set of recommendations; and in the second iteration, updating the first value, the second value, and the number in the memory based on adding the recommendation to the subset of recommendations.

20. An apparatus comprising:

one or more computer processors; and a non-transitory computer-readable storage medium comprising instructions, that when executed, control the one or more computer processors to be configured for:

receiving a candidate set of recommendations for video entities on a video delivery service in response to receiving a request from a client device to generate a page of an interface in an online environment;

receiving relevance ratings for recommendations in the candidate set of recommendations, wherein a relevance rating is based on a recommendation's relevance to a user using the client device;

generating a number for each recommendation that represents the relevance rating of the respective recommendation minus a similarity rating between the respective recommendation and recommendations from the candidate set of recommendations that are added to a subset of recommendations;

adding a recommendation from the candidate set of recommendations to the subset of recommendations that has a maximum probability of being relevant to the user and diverse from the recommendations in the subset of recommendations based on the number, wherein adding the recommendation to the subset of recommendations removes the recommendation from the candidate set of recommendations;

updating the number for recommendations in the candidate set of recommendations based on adding the recommendation to the subset of recommendations, wherein updating the number comprises:

retrieving a first value of a first variable that was stored in memory from a prior iteration;

using the first value of the first variable to generate a second value of a second variable; and using the second value to update the number;

iteratively performing the adding and the updating until a limit of a number of recommendations in the subset of recommendations is reached or the probability of adding any recommendation from the candidate set is zero; and providing the subset of recommendations in the page of the interface to the client device in the online environment.

* * * * *